(12) United States Patent
Fujii

(10) Patent No.: US 11,833,865 B2
(45) Date of Patent: Dec. 5, 2023

(54) PNEUMATIC TIRE

(71) Applicant: The Yokohama Rubber Co., LTD., Tokyo (JP)

(72) Inventor: Hiroshi Fujii, Hiratsuka (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 589 days.

(21) Appl. No.: 17/054,113

(22) PCT Filed: May 7, 2019

(86) PCT No.: PCT/JP2019/018291
§ 371 (c)(1),
(2) Date: Nov. 9, 2020

(87) PCT Pub. No.: WO2019/216323
PCT Pub. Date: Nov. 14, 2019

(65) Prior Publication Data
US 2021/0114412 A1 Apr. 22, 2021

(30) Foreign Application Priority Data
May 9, 2018 (JP) .................. 2018-090646

(51) Int. Cl.
B60C 11/00 (2006.01)
B60C 3/04 (2006.01)
B60C 9/28 (2006.01)
B60C 11/03 (2006.01)
(Continued)

(52) U.S. Cl.
CPC .................. *B60C 3/04* (2013.01); *B60C 9/28* (2013.01); *B60C 11/0083* (2013.01); *B60C 11/0332* (2013.01); *B60C 9/20* (2013.01); *B60C 15/0603* (2013.01); *B60C 2011/0341* (2013.01); *B60C 2011/0355* (2013.01); *B60C 2015/061* (2013.01)

(58) Field of Classification Search
CPC .................................................. B60C 11/0332
See application file for complete search history.

(56) References Cited

U.S. PATENT DOCUMENTS

| 5,849,118 A | 12/1998 | Matsumoto |
| 6,058,995 A | 5/2000 | Matsumoto |
| 6,102,094 A | 8/2000 | Matsumoto |

(Continued)

FOREIGN PATENT DOCUMENTS

| DE | 11 2014 002 102 T5 | 1/2016 |
| DE | 11 2017 003 571 T5 | 5/2019 |

(Continued)

OTHER PUBLICATIONS

International Search Report for International Application No. PCT/JP2019/018291 dated Jul. 23, 2019, 7 pages, Japan.

*Primary Examiner* — Kendra Ly
(74) *Attorney, Agent, or Firm* — Thorpe North & Western

(57) ABSTRACT

In a state in which the pneumatic tire is mounted on a regular rim and inflated to 5% of a specified internal pressure, a tread width is TW, a total tire width is SW in a tire meridian cross-sectional view, a relationship of $0.80 \leq TW/SW \leq 0.95$ is satisfied, a ground contact width at a load of 100% of a maximum load capacity is CW100, a ground contact width at a load of 70% of the maximum load capacity is CW70, and a relationship of $1.04 \leq CW100/CW70 \leq 1.15$ is satisfied.

18 Claims, 6 Drawing Sheets

(51) Int. Cl.
*B60C 9/20* (2006.01)
*B60C 15/06* (2006.01)

(56) References Cited

U.S. PATENT DOCUMENTS

| | | | |
|---|---|---|---|
| 6,192,952 | B1 | 2/2001 | Matsumoto |
| 6,564,839 | B1 * | 5/2003 | Manne ................. B60C 11/042 |
| | | | 152/209.25 |
| 2003/0000617 | A1 | 1/2003 | Matsumoto |
| 2004/0182486 | A1 | 9/2004 | Bernard et al. |
| 2007/0187030 | A1 | 8/2007 | Bernard et al. |
| 2013/0213545 | A1 | 8/2013 | Tanaka |
| 2016/0068023 | A1 | 3/2016 | Kunugi |
| 2017/0057302 | A1 | 3/2017 | Makino |
| 2017/0334249 | A1 * | 11/2017 | Kanaya ............... B60C 11/0316 |
| 2019/0009615 | A1 | 1/2019 | Tatsuta et al. |
| 2019/0359000 | A1 | 11/2019 | Ishikawa |

FOREIGN PATENT DOCUMENTS

| | | |
|---|---|---|
| EP | 3 023 270 B1 | 6/2018 |
| JP | H09-254608 | 9/1997 |
| JP | 2005-053268 | 3/2005 |
| JP | 2005-132247 | 5/2005 |
| JP | 2013-241155 | 12/2013 |
| JP | 5469692 | 4/2014 |
| JP | 2015-202765 | 11/2015 |
| JP | 5952587 | 7/2016 |
| JP | 2019-014313 | 1/2019 |
| WO | WO 97/09182 | 3/1997 |
| WO | WO 2015/159468 | 10/2015 |

\* cited by examiner

PNEUMATIC TIRE

TECHNICAL FIELD

The present technology relates to a pneumatic tire with reduced rolling resistance in a normal load loading state and improved dry braking performance.

BACKGROUND ART

Various techniques for reducing rolling resistance which is an important factor for improving fuel economy and the like have been proposed.

For example, a technique of decreasing the thickness of a rubber that forms a shoulder region to achieve light weight to reduce the rolling resistance has been proposed (Japan Patent No. 5469692). Moreover, a technique has been proposed in which the ratio TR3/TR2 of the radius of curvature TR3 at 300 kPa which is the high internal pressure setting to the radius of curvature TR2 at 230 kPa which is the internal pressure that approximates the regular internal pressure and the specified air pressure of the tire for a passenger car is set to 1.10 to 1.50, so that even when the tire is inflated to a high internal pressure, the tread central region TC bulges in a well-balanced manner to reduce the rolling resistance (Japan Patent No. 5952587).

In recent years, there has been an increasing demand for quicker and more accurate stop in a braking load loading state as well as reduced rolling resistance in a normal load loading state and improved fuel consumption performance.

From this perspective, as in the technique of Japan Patent No. 5469692, when the thickness of the rubber that forms the shoulder region is decreased, a sufficient ground contact is ensured. Thus, there is a risk that a sufficient frictional force in a brake load loading state is not obtained. As in the technique of Japan Patent No. 5952587, when the ratio TR3/TR2 is set to 1.10 to 1.50, the tread central region TC bulges too much in an air inflation state of the specified air pressure or higher. Thus, there is a risk that a sufficient ground contact width is not ensured and a sufficient frictional force in the brake load loading state is not obtained. As described above, in Japan Patent Nos. 5469692 and 5952587, there is room for improvement in increasing the frictional force in the brake load loading state and improving the dry braking performance.

SUMMARY

The present technology provides a pneumatic tire with reduced rolling resistance in the normal load loading state and improved dry braking performance in a well-balanced manner.

A pneumatic tire according to the present technology includes: a pair of left and right bead portions; sidewall portions connected to an outer side in a radial direction of the bead portions; a tread portion extending between the sidewall portions; a carcass including at least one carcass plies extending in a toroidal shape between the pair of left and right bead portions; a belt including at least one belt layers disposed on an outer side in a tire radial direction of the carcass and including cords; and a tread rubber disposed on an outer side in the tire radial direction of the belt and constituting a portion of the tread portion, in a state in which the pneumatic tire is mounted on a regular rim and inflated to 5% of a specified internal pressure, when a tread width is W and a total tire width is SW in a tire meridian cross-sectional view, a relationship of $0.80 \leq TW/SW \leq 0.95$ being satisfied, and when a ground contact width at a load of 100% of a maximum load capacity is CW100 and a ground contact width at a load of 70% of the maximum load capacity is CW70, a relationship of $1.04 \leq CW100/CW70 \leq 1.15$ being satisfied.

In the pneumatic tire according to an embodiment of the present technology, improvements are added to the ratio of the tread width to the total tire width and the ratio of the ground contact width in the brake load loading state to the ground contact width in the normal load loading state. As a result, according to the pneumatic tire according to an embodiment of the present technology, it is possible to improve the rolling resistance in the normal load loading state and the dry braking performance in a well-balanced manner.

DETAILED DESCRIPTION

Pneumatic tires according to embodiments (including Basic Embodiment and Additional Embodiments 1 to 8) of the present technology are described below based on the drawings. Note that the present technology is not limited to these embodiments. Constituents of the embodiments include components that are substantially identical or that can be substituted or easily conceived by one skilled in the art. In addition, various modes included in the embodiments can be combined as desired within the scope of obviousness by one skilled in the art.

Basic Embodiment

The following is a description of the Basic Mode of the pneumatic tire according to an embodiment of the present technology. Herein, "tire radial direction" refers to the direction orthogonal to the rotation axis of the pneumatic tire. "Inward in the tire radial direction" refers to the direction toward the rotation axis in the tire radial direction. "Outward in the tire radial direction" refers to the direction away from the axis of rotation in the tire radial direction. "Tire circumferential direction" refers to the circumferential direction with the rotation axis as the center axis. Moreover, "tire width direction" refers to a direction parallel to the rotation axis, "inner side in the tire width direction" refers to a side toward a tire equatorial plane (tire equator line) in the tire width direction, and "outer side in the tire width direction" refers to a side away from the tire equatorial plane in the tire width direction. Note that "tire equatorial plane" refers to the plane orthogonal to the rotation axis of the pneumatic tire, the plane passing through the center of the tire width of the pneumatic tire.

Figure 1:
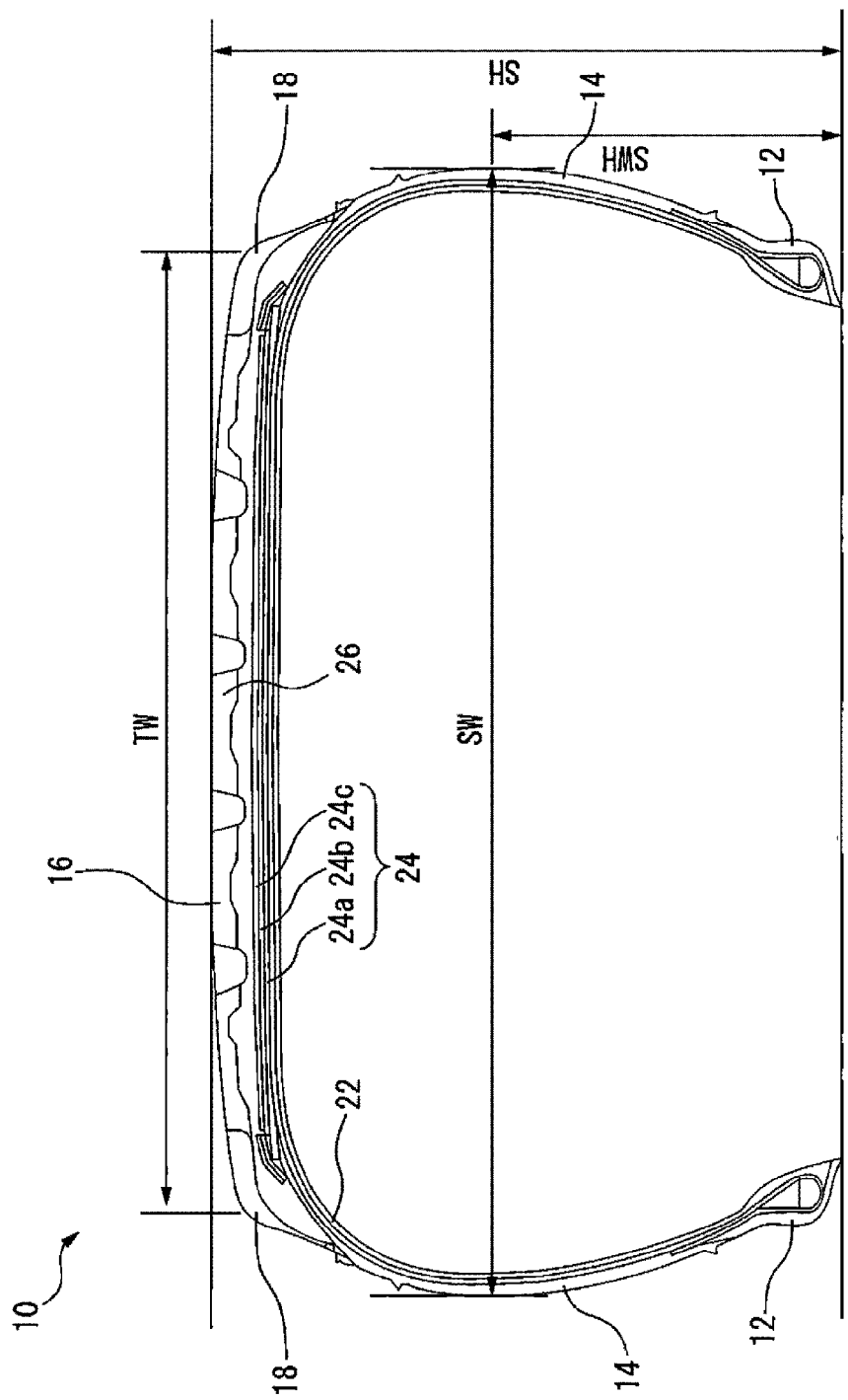
FIG. 1 is a tire meridian cross-sectional view illustrating a pneumatic tire according to an embodiment of the present technology.

FIG. 1 is a tire meridian cross-sectional view illustrating a pneumatic tire according to an embodiment of the present technology. A pneumatic tire 10 illustrated in the same drawing includes a pair of left and right bead portions 12, sidewall portions 14 connected to outer sides in a radial direction of the bead portions 12, and a tread portion 16 spanning between the sidewall portions 14.

The pneumatic tire 10 illustrated in FIG. 1 includes a carcass 22 including at least one carcass plies (one carcass ply is illustrated in the same drawing) extending in a toroidal shape between the pair of left and right bead portions 12 and 12, a belt 24 that includes at least one belt layers 24a to 24c (three layers are illustrated in the same drawing) disposed on the outer side in the tire radial direction of the carcass 22 and including cords, and a tread rubber 26 disposed on the outer side in the tire width direction of the belt 24 and constituting a portion of the tread portion 16.

Under the assumptions as described above, in a state in which the pneumatic tire 10 is mounted on a regular rim and inflated to 5% of a specified internal pressure, as illustrated in FIG. 1, the pneumatic tire 10 of the present embodiment satisfies a relationship of $0.80 \leq TW/SW \leq 0.95$ when the tread width is TW and the total tire width is SW in a tire meridian cross-sectional view, and satisfies a relationship of $1.04 \leq CW100/CW70 \leq 1.15$ when the ground contact width (a dimension in the tire width direction of the ground contact surface) at a load of 100% of the maximum load capacity is CW100, and the ground contact width at a load of 70% of the maximum load capacity is CW70.

Here, "specified rim" refers to an "applicable rim" defined by the Japan Automobile Tyre Manufacturers Association (JATMA), a "Design Rim" defined by the Tire and Rim Association (TRA), and a "Measuring Rim" defined by the European Tyre and Rim Technical Organisation (ETRTO). Additionally, "specified internal pressure" refers to a "maximum air pressure" defined by JATMA, to the maximum value in "TIRE LOAD LIMITS AT VARIOUS COLD INFLATION PRESSURES" defined by TRA, and to "INFLATION PRESSURES" defined by ETRTO. Furthermore, "maximum load capacity" refers to the "maximum load capacity" defined by JATMA, the maximum value in "TIRE LOAD LIMITS AT VARIOUS COLD INFLATION PRESSURES" defined by TRA, or the "LOAD CAPACITY" defined by ETRTO.

Effects

In general, in a normal load loading state, it is desirable to reduce the ground contact area and hence the rolling resistance so as to reduce fuel consumption. On the other hand, in a brake load loading state, it is desirable to increase the ground contact area and improve the braking performance so as to achieve reliable stop.

In the present embodiment, improvements are added to the ratio between the tread width TW and the total tire width SW and the ratio of the ground contact width CW100 in the brake load loading state to the ground contact width CW70 in the normal load loading state.

By setting the ratio TW/SW of the tread width TW to the total tire width SW to 0.80 or greater, a sufficient ground contact width and a sufficient ground contact area of the so-called shoulder portion 18 at or near the boundary between the sidewall portion 14 and the tread portion 16 can be ensured, and the frictional force in the brake load loading state can be increased (Effect 1). In contrast, by setting the ratio TW/SW of the tread width TW to the total tire width SW to 0.95 or less, the ground contact pressure at the shoulder portion 18 is not excessive, and the rolling resistance in the normal load loading state can be reduced (Effect 2).

Note that the ratio TW/SW of the tread width TW to the total tire width SW is preferably set to 0.83 or greater and 0.92 or less, and more preferably 0.85 or greater and 0.90 or less.

By setting the ratio CW100/CW70 of the ground contact width (ground contact width in the brake load loading state) CW100 at a load of 100% of the maximum load capacity to the ground contact width (ground contact width in the normal load loading state) CW70 at a load of 70% of the maximum load capacity to 1.04 or greater, a sufficient ground contact width in the brake load loading state can be ensured and hence the friction force in the brake load loading state can be increased (Effect 3). In contrast, by setting the ratio CW100/CW70 to 1.15 or less, the rolling resistance in the brake load loading state can be reduced without increasing the ground contact length (a dimension in the tire circumferential direction in the ground contact state) in the brake load loading state too much (Effect 4).

Note that the ratio CW100/CE70 of the ground contact width CW100 to the ground contact width CW70 is preferably set to 1.06 or greater and 1.13 or less, and more preferably set to 1.08 or greater and 1.11 or less.

As described above, in the pneumatic tire according to the present embodiment, since improvements are added to the ratio TW/SW and the ratio CW100/CW70, it is possible to reduce the rolling resistance in the normal load loading state due to Effect 2 and it is possible to increase the frictional force in the brake load loading state and hence the dry braking performance due to combination of Effects 1, 3, and 4.

The pneumatic tire according to the present embodiment is obtained through various general manufacturing processes, in other words, a step of mixing tire materials, a step of processing the tire materials, a step of molding a green tire, a vulcanization step, an inspection step after vulcanization, and the like. When manufacturing the pneumatic tire according to the present embodiment, for example, protrusion portions and recess portions corresponding to grooves and protrusion portions formed in the tread portion illustrated in FIG. 1 are formed in the inner wall of a vulcanization mold, and vulcanization is performed using this mold.

ADDITIONAL EMBODIMENTS

Next, descriptions are made of Additional Modes 1 to 9 which can be optionally implemented as opposed to Basic Mode of the pneumatic tire according to an embodiment of the present technology described above.

Additional Embodiment 1

Figure 2:
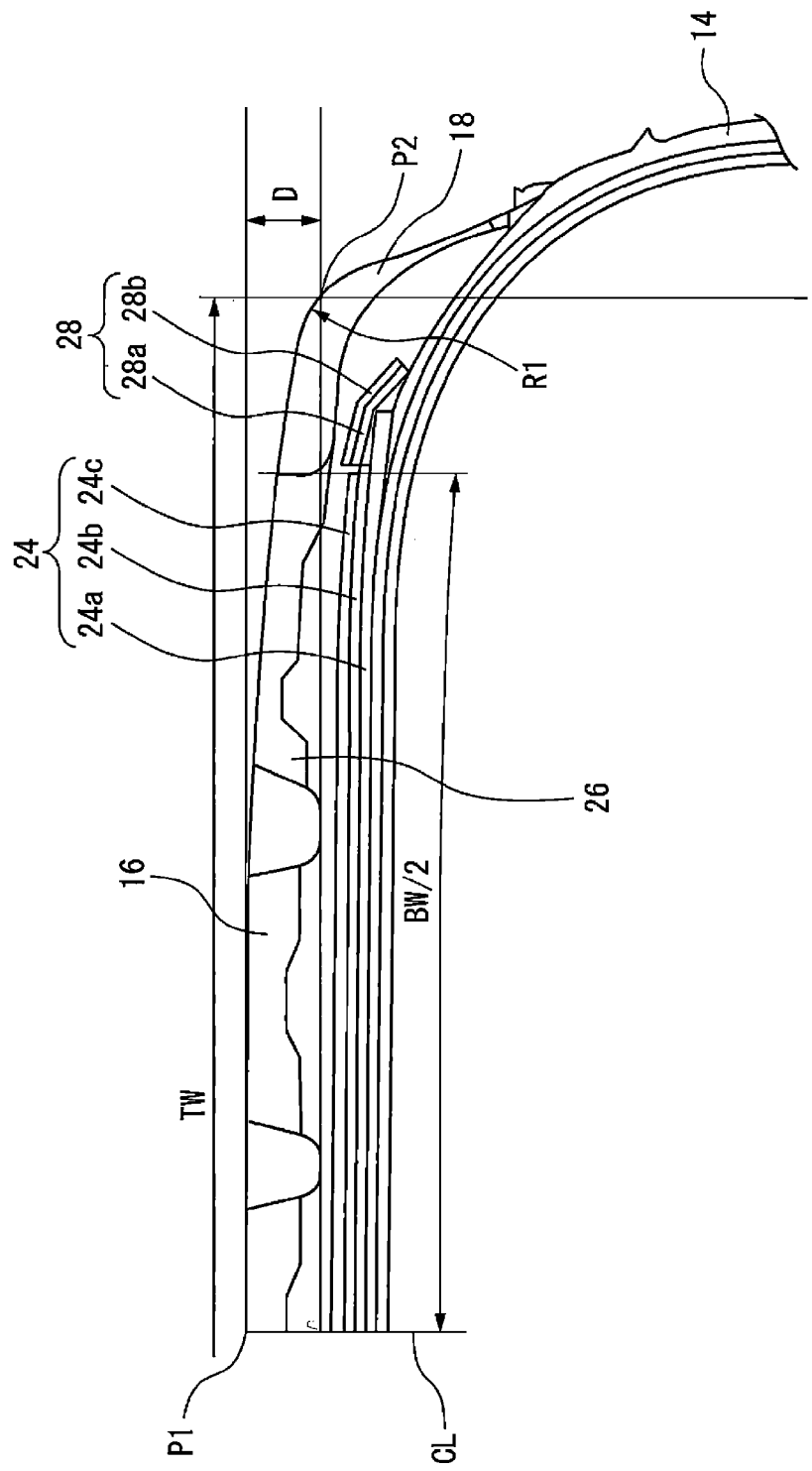
FIG. 2 is a tire meridian cross-sectional view of the pneumatic tire of the present embodiment illustrated in FIG. 1, illustrating only one side in a tire width direction from a tire equatorial plane CL, extending from a sidewall portion to a tread portion.

FIG. 2 is a tire meridian cross-sectional view of the pneumatic tire of the present embodiment illustrated in FIG.

1, illustrating only one side in the tire width direction from the tire equatorial plane CL, extending from the sidewall portion 14 to the tread portion 16. In Basic Embodiment, as illustrated in FIGS. 1 and 2, it is desirable that, when the tire radial direction dimension between a tire radial direction outermost point P1 of the tire equatorial plane CL and a tire width direction endpoint P2 of the tread rubber 26 is D, a tire cross-sectional height is SH, a tire radial direction height up to the tire maximum width position is SWH, and the radius of curvature of the arc of the shoulder portion is R1, a relationship of TW×0.04−(SWH/SH−0.5)×15≤D≤TW×0.07−(SWH/SH−0.5)×15 is satisfied, a relationship of 5 mm≤R1≤30 mm is satisfied, the ratio BW/TW of the width BW of the effective belt layer 24c to the tread width TW satisfies a relationship of 0.80≤BW/TW≤0.90, and the belt cover 28 is formed on the outer side in the tire width direction of the belt layer 24a having the maximum width (Additional Embodiment 1). Note that in the example illustrated in FIG. 2, the belt cover 28 includes two belt cover layers 28a and 28b connected in the tire radial direction.

Here, "tire cross-sectional height SH" refers to the tire radial direction dimension from a portion of the contact between the bead portion 12 and the rim to the tire radial direction outermost position of the tread portion 16. "Tire radial direction height SWH" up to the tire maximum width position refers to the tire radial direction dimension from a portion of the contact between the bead portion 12 and the rim to the tire maximum width position. The arc of the shoulder portion refers to an arc that forms the outer contour of the shoulder portion 18 illustrated in FIGS. 1 and 2.

"Effective belt layer" refers to the belt layer 24c of which the tire width direction outermost position is located on the innermost side in the tire width direction among the belt layers (24a, 24b, and 24c) that form the belt 24.

By setting the tire radial direction dimension D to [TW×0.04−(SWH/SH−0.5)×15] or greater, the rolling resistance in the normal load loading state can be further reduced without excessively increasing the ground contact width (the tire width direction dimension in the ground contact state).

In contrast, by setting the tire radial direction dimension D to be equal to or less than [TW×0.04−(SWH/SH−0.5)×15], a sufficient ground contact width and hence a sufficient ground contact area of the shoulder portion can be ensured, the frictional force in the brake load loading state can be further increased, and hence, the dry braking performance can be further increased.

By setting the radius of curvature R1 of the arc of the shoulder portion to 5 mm or greater, the rolling resistance in the normal load loading state can be further reduced without excessively increasing the ground contact width (a dimension in the tire width direction in the ground contact state).

In contrast, by setting the radius of curvature R1 of the arc of the shoulder portion to 30 mm or less, a sufficient ground contact width and hence a sufficient ground contact area of the shoulder portion can be ensured, the frictional force in the brake load loading state can be further enhanced, and the dry braking performance can be further increased.

Note that the radius of curvature R1 is more preferably 8 mm or greater and 27 mm or less, and most preferably 10 mm or greater and 25 mm or less.

Since the ratio BW/TW is 0.80 or greater, the belt 24 can be sufficiently ensured on the outer side in the tire width direction of the tread portion 16, and durability performance can be improved. In contrast, since the ratio BW/TW is 0.90 or less, it is possible to prevent the belt 24 from becoming unnecessarily long.

Note that the ratio BW/TW is more preferably 0.82 or greater and 0.88 or less, and most preferably 0.83 or greater and 0.87 or less.

Since the belt cover 28 is formed on the outer side in the tire width direction of the belt layer 24a having a maximum width, deflection of the shoulder portion 18 during rolling of the tire is suppressed, and the occurrence of cracking originating from the end portion of the belt 24 can be suppressed.

Additional Embodiment 2

Figure 3:
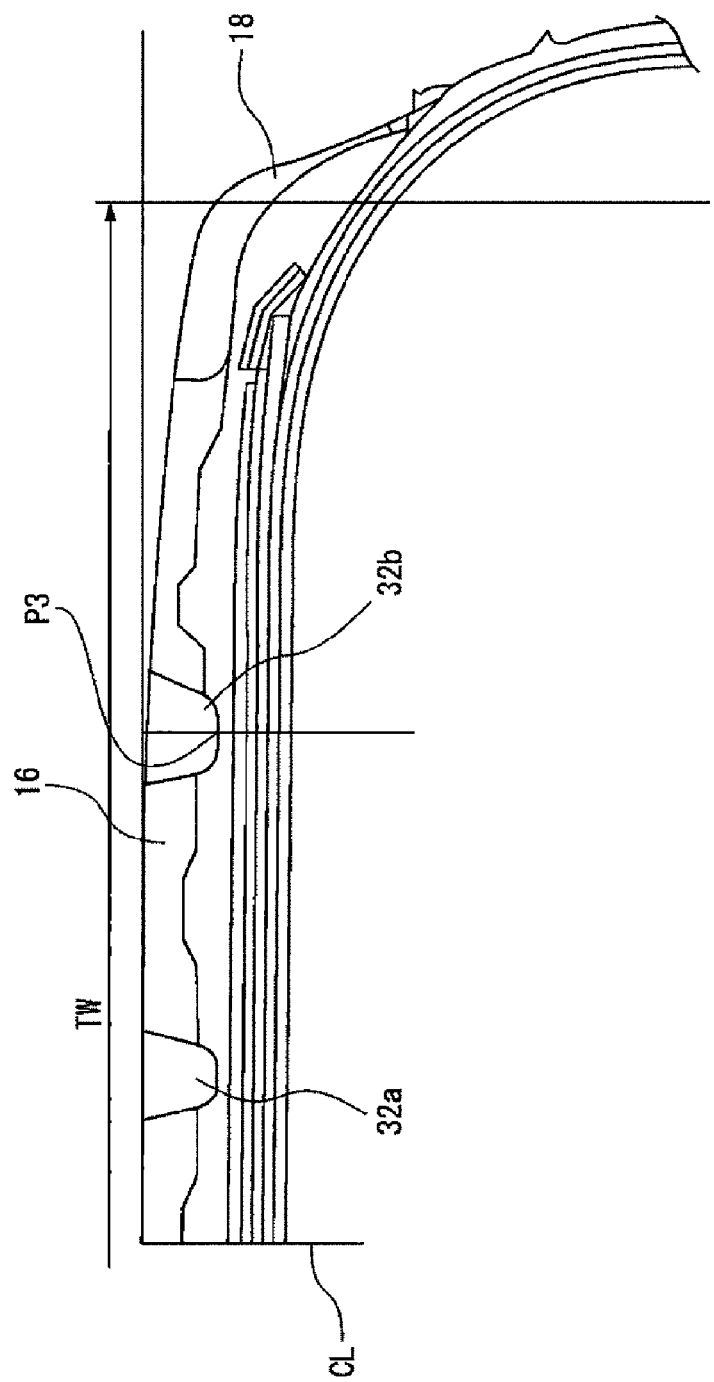
FIG. 3 is a tire meridian cross-sectional view of the pneumatic tire of the present embodiment illustrated in FIG. 1, illustrating only one side in the tire width direction from the tire equatorial plane CL, extending from a tread portion to a shoulder portion.

FIG. 3 is a tire meridian cross-sectional view of the pneumatic tire of the present embodiment illustrated in FIG. 1, illustrating only one side in the tire width direction from the tire equatorial plane CL, extending from the tread portion 16 to the shoulder portion 18. In Basic Embodiment and an embodiment in which Additional Embodiment 1 is added to Basic Embodiment, as illustrated in FIG. 3, the tread portion 16 preferably includes at least two main grooves extending in the tire circumferential direction (in the same drawing, two main grooves 32a and 32b on one side in the tire width direction from the tire equatorial plane), and the center position P3 in the tire width direction of the main groove 32b on the outermost side in the tire width direction among the main grooves 32a and 32b is preferably present at a position at a distance of ¼ or less of the tread width TW from the tire equatorial plane CL (Additional Embodiment 2).

Here, "main groove" refers to a groove on which a wear indicator must be provided as specified by JATMA and typically has a width of 2% or greater of the tread width TW. Moreover, the center position P3 in the tire width direction of the main groove 32b on the outermost side in the tire width direction refers to the center position in the tire width direction of the groove bottom of the main groove 32b.

Since the center position P3 in the tire width direction of the main groove 32b on the outermost side in the tire width direction is present at a position at a distance of ¼ or less of the tread width TW from the tire equatorial plane CL, a sufficient ground contact area of the shoulder portion 18 can be ensured without forming the main groove on the tread surface close to the shoulder portion 18, the frictional force in the brake load loading state can be further increased, and hence, the dry braking performance can be further increased.

Note that the center position P3 in the tire width direction is more preferably present at a position at a distance of 23/100 or less of the tread width TW from the tire equatorial plane CL, and most preferably located at a position at a distance of 21/100 or less.

Additional Embodiment 3

Figure 4:
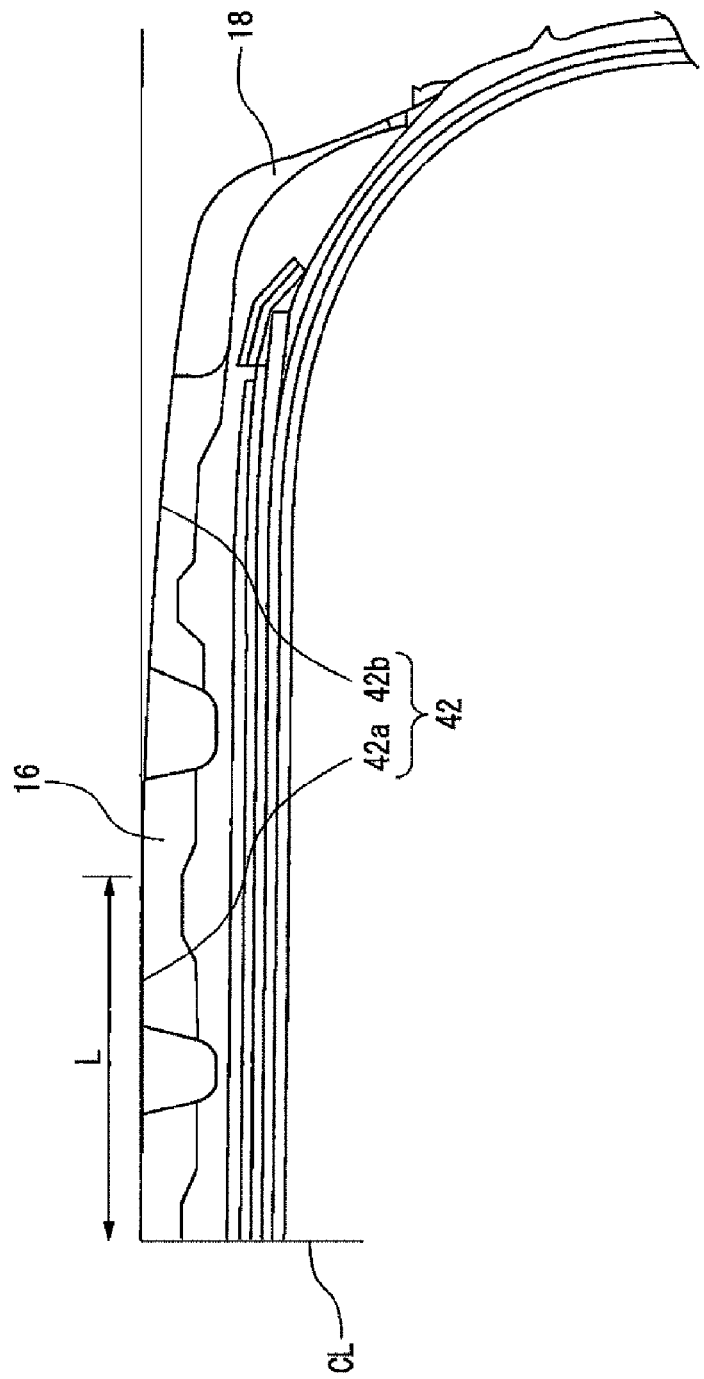
FIG. 4 is a tire meridian cross-sectional view of the pneumatic tire of the present embodiment illustrated in FIG. 1, illustrating only one side in the tire width direction from the tire equatorial plane CL, extending from the tread portion to the shoulder portion.

FIG. 4 is a tire meridian cross-sectional view of the pneumatic tire of the present embodiment illustrated in FIG. 1, illustrating only one side in the tire width direction from the tire equatorial plane CL, extending from the tread portion 16 to the shoulder portion 18. In Basic Embodiment or an embodiment in which at least one of Additional Embodiments 1 and 2 is added to Basic Embodiment, as illustrated in FIG. 4, an outer contour 42 of the tread portion 16 preferably includes a central portion arc 42a located at a central portion in the tire width direction and a pair of shoulder arcs 42b connected to the outer side in the tire width direction of the central portion arc 42a, and a relationship of 0.40≤L/(TW/2)≤0.70 is preferably satisfied when the length in the tire width direction of the central portion arc 42a is 2L (Additional Embodiment 3). Note that, although the central portion arc 42*a* is illustrated in only a portion on one side of the tire equatorial plane CL in FIG. 4, a half thereof is actually present on the other side of the tire equatorial plane CL.

By setting the ratio L/(TW/2) to 0.40 or greater, the ground contact width, and hence the ground contact area of the shoulder portion, can be further ensured, the frictional force in the brake load loading state can be further enhanced, and the dry braking performance can be further increased.

In contrast, by setting the ratio L/(TW/2) to 0.70 or less, the rolling resistance in the normal load loading state can be further decreased without excessively increasing the ground contact width.

Note that the ratio L/(TW/2) is more preferably 0.45 or greater and 0.65 or less, and most preferably 0.50 or greater and 0.60 or less.

Additional Embodiment 4

In Basic Embodiment or an embodiment in which at least one of Additional Embodiments 1 to 3 is added to Basic Embodiment, it is preferable that the tire outer diameter is equal to or greater than the standard center value (Additional Embodiment 4).

Here, "standard" refers to JATMA, TRA, or ETRTO described above. Moreover, "standard center value" refers to a value located in the center in a case where a plurality of outer diameters listed in JATMA or the like are arranged in ascending order.

By setting the tire outer diameter to be equal to or less than the standard center value, in other words, by increasing the tire outer diameter to a certain degree, a sufficient volume of the cavity inside the tire can be ensured, the deflection of the tire in the brake load loading state as well as the deflection of the tire in the normal load loading state can be reduced, and hence rolling resistance in both load loading states can be reduced.

Note that by setting the tire outer diameter to be equal to or greater than a value 3 mm smaller than the standard maximum value, the effect described above can be achieved at a higher level.

Additional Embodiment 5

In Basic Embodiment or an embodiment in which at least one of Additional Embodiments 1 to 4 is added to Basic Embodiment, it is preferable that the total tire width is equal to or greater than a standard center value (Additional Embodiment 5).

Here, "standard" refers to JATMA, TRA, or ETRTO described above. Moreover, "standard center value" refers to a value located in the center in a case where a plurality of total tire widths listed in JATMA or the like are arranged in ascending order.

By setting the total tire width to be equal to or less than the standard center value, in other words, by increasing the tire outer diameter to a certain degree, a sufficient volume of the cavity inside the tire can be ensured, the deflection of the tire in the brake load loading state as well as the deflection of the tire in the normal load loading state can be reduced, and hence rolling resistance in both load loading states can be reduced.

Note that by setting the total tire width to be equal to or greater than a value 3 mm smaller than the standard maximum value, the effect described above can be achieved at a higher level.

Additional Embodiment 6

Figure 5:
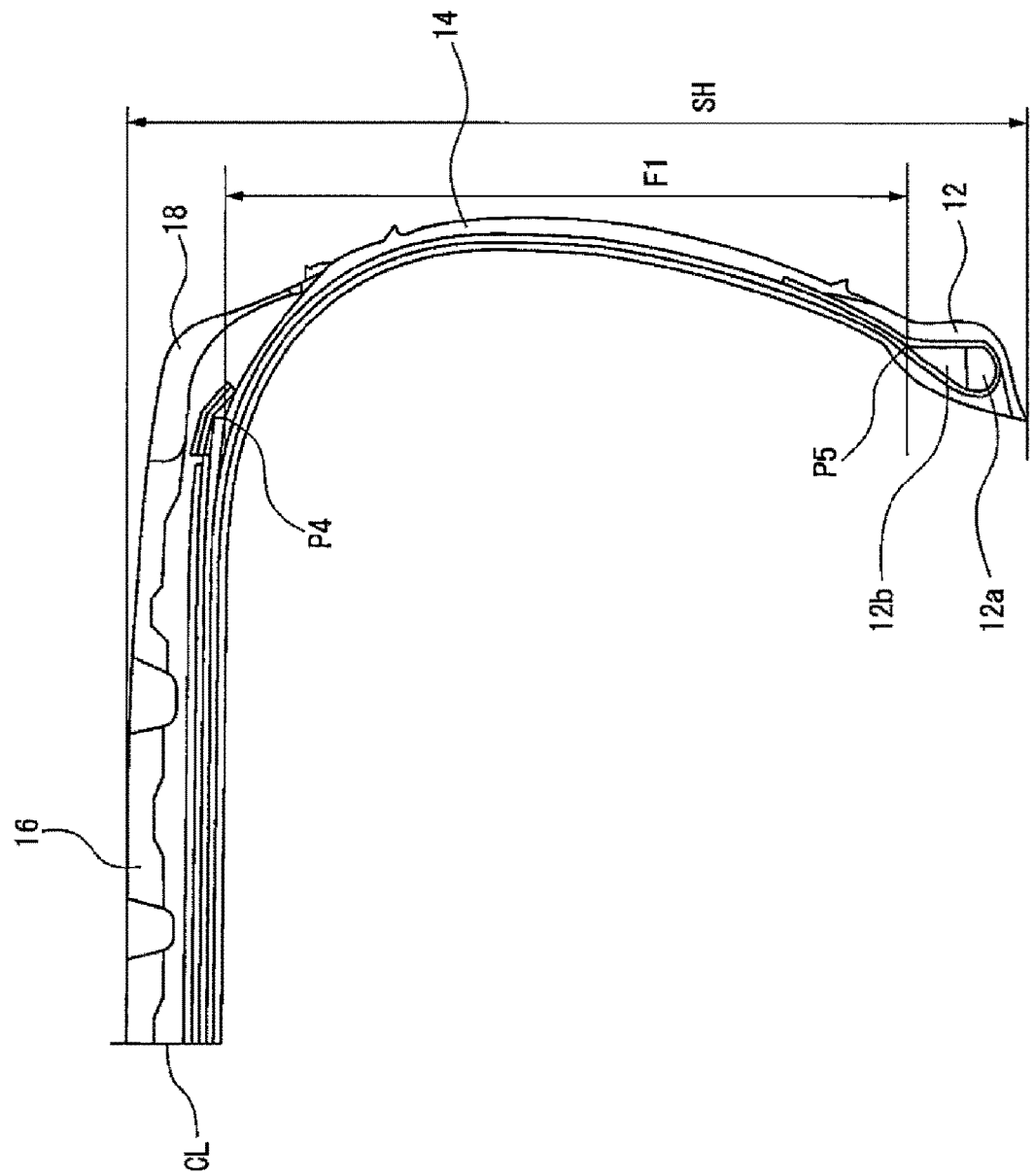
FIG. 5 is a tire meridian cross-sectional view of the pneumatic tire of the present embodiment illustrated in FIG. 1, illustrating only one side in the tire width direction from the tire equatorial plane CL, extending from the bead portion to the tread portion.

FIG. 5 is a tire meridian cross-sectional view of the pneumatic tire of the present embodiment illustrated in FIG. 1, illustrating only one side in the tire width direction from the tire equatorial plane CL, extending from the bead portion 12 to the tread portion 16. Note that the example illustrated in FIG. 5 is a type in which the bead portion 12 includes a bead core 12*a* and a bead filler 12*b* formed on the outer side in the tire radial direction of the bead core 12*a*.

In Basic Embodiment or an embodiment in which at least one of Additional Embodiments 1 to 5 is added to Basic Embodiment, as illustrated in FIG. 5, it is preferable that a relationship of $0.50 \leq F1/SH \leq 0.80$ is satisfied when the tire radial direction dimension from the belt edge P4 to the bead filler top P5 is F1 (Additional Embodiment 6).

By setting the ratio F1/SH to 0.50 or greater, a region which extends from the sidewall portion 14 to the shoulder portion 18 and which is likely to be deformed due to the influence of a load is sufficiently deflected. Due to this, a sufficient ground contact width, and hence a sufficient ground contact area of the shoulder portion, can be ensured, the frictional force in the braking load loading state can be further enhanced, and the dry braking performance can be further increased. In contrast, by setting the ratio F1/SH to 0.80 or less, it is possible to suppress excessive deflection of the region. Due to this, the rolling resistance in the normal load loading state can be further reduced without unnecessarily increasing the ground contact width.

Note that the ratio F1/SH is more preferably 0.55 or greater and 0.75 or less, and most preferably 0.60 or greater and 0.70 or less.

Additional Embodiment 7

In Basic Embodiment or an embodiment in which at least one of Additional Embodiments 1 to 5 is added to Basic Embodiment, it is preferable that a relationship of $0.50 \leq F2/SH \leq 0.80$ is satisfied when only the bead core is present in the bead portion, the bead filler is not present, and the tire radial direction dimension from the belt edge to the bead core is defined as F2 (Additional Embodiment 7). Note that this embodiment is a modified example of Additional Embodiment 6.

By setting the ratio F2/SH to 0.50 or greater, a region which extends from the sidewall portion 14 to the shoulder portion 18 and which is likely to be deformed due to the influence of a load is sufficiently deflected. Due to this, a sufficient ground contact width, and hence a sufficient ground contact area of the shoulder portion, can be ensured, the frictional force in the braking load loading state can be further enhanced, and the dry braking performance can be further increased. In contrast, by setting the ratio F2/SH to 0.80 or less, it is possible to suppress excessive deflection of the region. Due to this, the rolling resistance in the normal load loading state can be further reduced without unnecessarily increasing the ground contact width.

Note that the ratio F2/SH is more preferably 0.55 or greater and 0.75 or less, and most preferably 0.60 or greater and 0.70 or less.

Additional Embodiment 8

Figure 6:
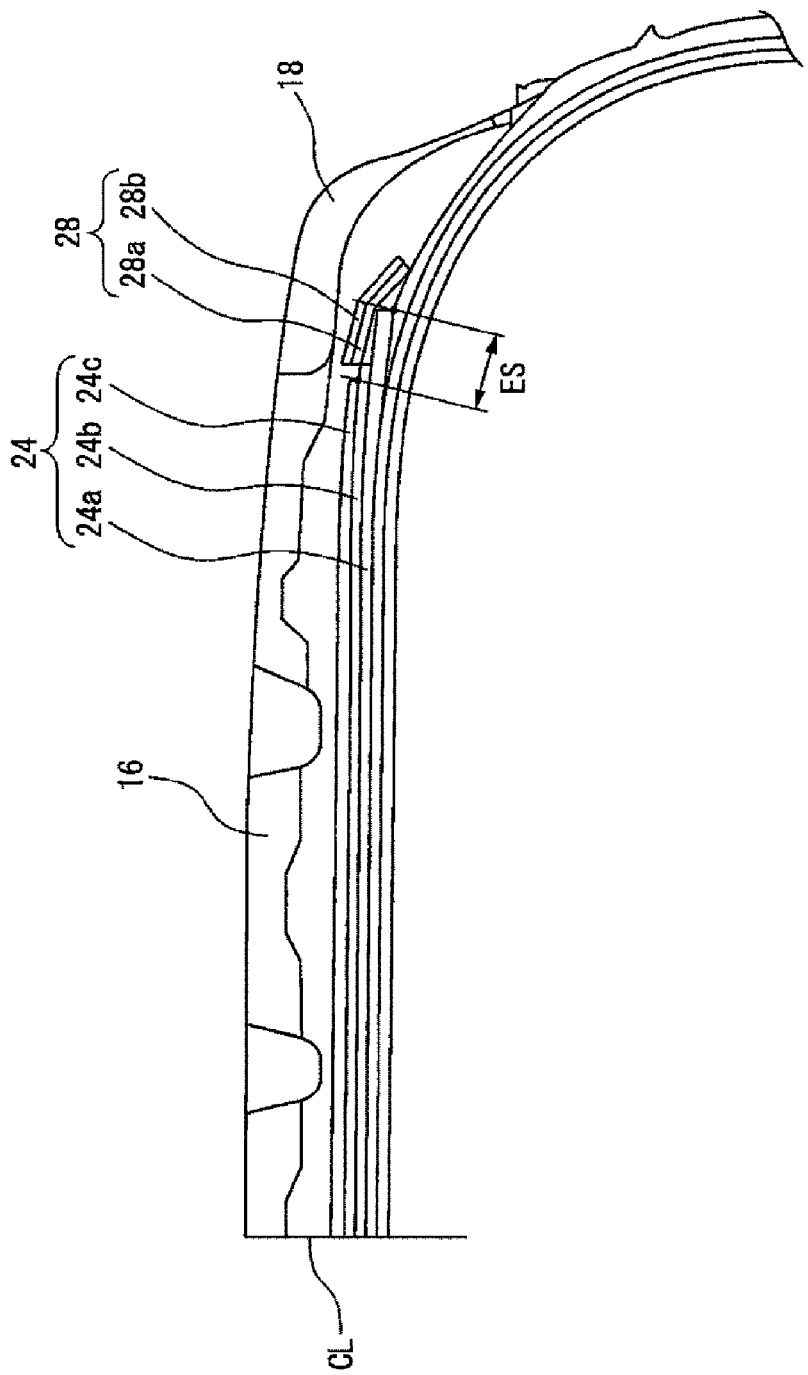
FIG. 6 is a tire meridian cross-sectional view of the pneumatic tire of the present embodiment illustrated in FIG. 1, illustrating only one side in the tire width direction from the tire equatorial plane CL, extending from the tread portion to the shoulder portion.

FIG. 6 is a tire meridian cross-sectional view of the pneumatic tire of the present embodiment illustrated in FIG. 1, illustrating only one side in the tire width direction from the tire equatorial plane CL, extending from the tread portion 16 to the shoulder portion 18. In Basic Embodiment or an embodiment in which at least one of Additional Embodiments 1 to 7 is added to Basic Embodiment, as illustrated in FIG. 6, it is preferable that an inter-belt-edge distance ES between the belt layer 24a with a maximum width and the belt layer 24c with a minimum width satisfies a relationship of 5 mm<ES<15 mm (Additional Embodiment 8).

Here, "width of the belt layer" refers to the dimension in the tire width direction of the belt layer. The inter-belt-edge distance ES refers to the distance between the outermost point in the tire width direction of the belt layer 24a having the maximum width and the outermost point in the tire width direction of the belt layer 24c having the minimum width.

By setting the inter-belt-edge distance ES to be greater than 5 mm, it is possible to sufficiently ensure a region where only the belt layer with the maximum width is present in the outer portion in the tire width direction. Due to this, deflection of the shoulder portion 18 can be sufficiently realized, and the ground contact width can be further reduced. As a result, the rolling resistance in the normal load loading state can be further reduced.

In contrast, by setting the inter-belt-edge distance ES to be smaller than 15 mm, an excessively large region in the tire width direction where the belt layer with the maximum width is formed but the belt layer with the smallest width is not formed is not present. Thus, the occurrence of cracking originating from the end portion of the belt 24 when the sidewall portion 14 is deflected can be further suppressed.

Note that the inter-belt-edge distance ES is more preferably 7 mm or greater and 13 mm or less, and most preferably 8 mm or greater and 12 mm or less.

Additional Embodiment 9

In Basic Embodiment or an embodiment in which at least one of Additional Embodiments 1 to 8 is added to Basic Embodiment, it is preferable that a relationship of 4.5 mm≤GD≤7.5 mm is satisfied when the depth of at least a main grooves including the tire equatorial plane or a main groove (for example, the main grooves 32a and 32b illustrated in FIG. 3) closest to the tire equatorial plane among the main grooves is GD (Additional Embodiment 9).

Here, the groove depth GD of the main groove refers to the dimension of the longest line segment from the tire profile line to the groove bottom among the perpendicular lines with respect to the tire profile line (the outer contour of the tire when the main groove is not present).

By setting the groove depth GD of the main groove to 4.5 mm or greater, the wear life of the main groove until the main groove is worn and the wear indicator is exposed can be sufficiently ensured, and hence drainage performance can be maintained for a long period of time. In contrast, by setting the groove depth GD of the main groove to 7.5 mm or less, it is possible to further reduce the rolling resistance during normal load loading without unnecessarily increasing the amount of tread rubber.

Note that the groove depth GD of the main groove is more preferably 5.0 mm or greater and 7.0 mm or less, and most preferably 5.5 mm or greater and 6.5 mm or less.

EXAMPLE

Pneumatic tires according to Examples 1 to 9 and Comparative Examples 1 to 3 having a tire size of 205/60R16 92V and a tire meridian cross-sectional shape illustrated in FIG. 1 (including bead fillers as well as bead cores in the bead portions) are manufactured. Note that the detailed conditions of these pneumatic tires are as illustrated in Tables 1 and 2 below. Note that in Tables 1 and 2, TW indicates the tread width, SW indicates the total tire width, CW100 indicates the ground contact width at a load of 100% of the maximum load capacity, CW70 indicates the ground contact width at a load of 70% of the maximum load capacity, D indicates a tire radial direction dimension between the outermost point in the tire radial direction of the tire equatorial plane and the end point in the tire width direction of the tread rubber, SH indicates a tire cross-sectional height, SWH indicates a height in a tire radial direction up to a tire maximum width position, R1 indicates the radius of curvature of the arc of the shoulder portion, BW indicates the width of the effective belt layer, GC indicates the distance from the tire equatorial plane to a center position in the tire width direction of the outermost main groove in the tire width direction, L indicates the length of half the length in the tire width direction of the central portion arc, F1 indicates a tire radial direction dimension from the belt edge to the bead filler top, the ES indicates an inter-belt-edge distance between the belt layer having the maximum width and the belt layer having the minimum width, and GD indicates the depth of the main groove.

Pneumatic tires of Examples 1 to 9 and Comparative Examples 1 to 3 manufactured in this manner were evaluated for rolling resistance and dry braking performance in accordance with the following procedures.

Rolling Resistance

The test tires are mounted on wheels having a rim size of 16×6 J, mounted on a drum testing machine, and a rolling resistance coefficient (RRC) was measured in accordance with ISO (International Organization for Standardization) 25280 under conditions of an air pressure of 210 kPa and an applied load of 4.94 kN. The evaluation results are represented by index values with respect to 100 of Comparative Example 1 using reciprocals of the measurement values. The higher index value, the lower the rolling resistance. The results are shown in Tables 1 and 2.

Dry Braking Performance

The test tires were mounted on wheels having a rim size of 16×6 J, mounted on a passenger vehicle, inflated to an air pressure (F/R) of 240 kPa/240 kPa after warm up, and a braking distance from an initial velocity of 100 km/h to complete stop on dry road surfaces was measured. The evaluation results are represented by index values with respect to 100 of Comparative Example 1 using reciprocals of the measurement values. The higher the index value, the superior the braking performance on dry road surfaces. The results are shown in Tables 1 and 2.

TABLE 1-1

| | Example 1 | Example 2 | Example 3 |
|---|---|---|---|
| TW (mm) | 166 | 180 | 180 |
| SW (mm) | 206 | 206 | 206 |
| TW/SW | 0.81 | 0.87 | 0.87 |
| CW100 (mm) | 160 | 170 | 170 |
| CW70 (mm) | 150 | 160 | 160 |
| CW100/CW70 | 1.07 | 1.06 | 1.06 |
| SH (mm) | 121.8 | 121.8 | 121.8 |
| SWH (mm) | 59 | 59 | 59 |
| TW × 0.04 − (SWH/SH − 0.5) × 15 | 6.9 | 7.4 | 7.4 |
| TW × 0.07 − (SWH/SH − 0.5) × 15 | 11.9 | 12.8 | 12.8 |
| D (mm) | 6 | 8 | 8 |
| R1 (mm) | 35 | 25 | 25 |
| BW (mm) | 160 | 155 | 155 |

TABLE 1-1-continued

|  | Example 1 | Example 2 | Example 3 |
|---|---|---|---|
| BW/TW | 0.96 | 0.86 | 0.86 |
| Presence/absence of belt cover | No | Yes | Yes |
| TW × ¼ (mm) | 41.5 | 45 | 45 |
| GC (mm) | 46 | 46 | 42 |
| L (mm) | 30 | 35 | 35 |
| L/(TW/2) | 0.36 | 0.39 | 0.39 |
| Standard center value of tire outer diameter (mm) | 652 | 652 | 652 |
| Tire outer diameter (mm) | 650 | 650 | 650 |
| Standard center value of total tire width (mm) | 209 | 209 | 209 |
| Total tire width (mm) | 206 | 206 | 206 |
| F1 (mm) | 60 | 60 | 60 |
| F1/SH | 0.49 | 0.49 | 0.49 |
| ES (mm) | 5 | 5 | 5 |
| GD (mm) | 8 | 8 | 8 |
| Rolling resistance | 100 | 100 | 100 |
| Dry braking performance | 101 | 102 | 102.5 |

TABLE 1-2

|  | Example 4 | Example 5 | Example 6 |
|---|---|---|---|
| TW (mm) | 180 | 180 | 190 |
| SW (mm) | 206 | 206 | 215 |
| TW/SW | 0.87 | 0.87 | 0.88 |
| CW100 (mm) | 170 | 170 | 176 |
| CW70 (mm) | 160 | 160 | 154 |
| CW100/CW70 | 1.06 | 1.06 | 1.14 |
| SH (mm) | 121.8 | 124.8 | 124.8 |
| SWH (mm) | 59 | 59 | 59 |
| TW × 0.04 − (SWH/SH − 0.5) × 15 | 7.4 | 7.6 | 8.0 |
| TW × 0.07 − (SWH/SH − 0.5) × 15 | 12.8 | 13.0 | 13.7 |
| D (mm) | 8 | 8 | 10 |
| R1 (mm) | 25 | 25 | 15 |
| BW (mm) | 155 | 155 | 155 |
| BW/TW | 0.86 | 0.86 | 0.82 |
| Presence/absence of belt cover | Yes | Yes | Yes |
| TW × ¼ (mm) | 45 | 45 | 47.5 |
| GC (mm) | 42 | 42 | 42 |
| L (mm) | 42 | 42 | 42 |
| L/(TW/2) | 0.47 | 0.47 | 0.47 |
| Standard center value of tire outer diameter (mm) | 652 | 652 | 652 |
| Tire outer diameter (mm) | 650 | 656 | 656 |
| Standard center value of total tire width (mm) | 209 | 209 | 209 |
| Total tire width (mm) | 206 | 206 | 215 |
| F1 (mm) | 60 | 60 | 60 |
| F1/SH | 0.49 | 0.48 | 0.48 |
| ES (mm) | 5 | 5 | 5 |
| GD (mm) | 8 | 8 | 8 |
| Rolling resistance | 101 | 103 | 103 |
| Dry braking performance | 102.5 | 102.5 | 104 |

TABLE 2-1

|  | Example 7 | Example 8 | Example 9 |
|---|---|---|---|
| TW (mm) | 190 | 190 | 190 |
| SW (mm) | 215 | 215 | 215 |
| TW/SW | 0.88 | 0.88 | 0.88 |
| CW100 (mm) | 176 | 176 | 176 |
| CW70 (mm) | 154 | 154 | 154 |
| CW100/CW70 | 1.14 | 1.14 | 1.14 |
| SH (mm) | 124.8 | 124.8 | 124.8 |
| SWH (mm) | 59 | 59 | 59 |
| TW × 0.04 − (SWH/SH − 0.5) × 15 | 8.0 | 8.0 | 8.0 |
| TW × 0.07 − (SWH/SH − 0.5) × 15 | 13.7 | 13.7 | 13.7 |
| D (mm) | 10 | 10 | 10 |
| R1 (mm) | 15 | 15 | 15 |
| BW (mm) | 155 | 155 | 155 |

TABLE 2-1-continued

|  | Example 7 | Example 8 | Example 9 |
|---|---|---|---|
| BW/TW | 0.82 | 0.82 | 0.82 |
| Presence/absence of belt cover | Yes | Yes | Yes |
| TW × ¼ (mm) | 47.5 | 47.5 | 47.5 |
| GC (mm) | 42 | 42 | 42 |
| L (mm) | 42 | 42 | 42 |
| L/(TW/2) | 0.44 | 0.44 | 0.44 |
| Standard center value of tire outer diameter (mm) | 652 | 652 | 652 |
| Tire outer diameter (mm) | 656 | 656 | 656 |
| Standard center value of total tire width (mm) | 209 | 209 | 209 |
| Total tire width (mm) | 215 | 215 | 215 |
| F1 (mm) | 80 | 80 | 80 |
| F1/SH | 0.64 | 0.64 | 0.64 |
| ES (mm) | 5 | 10 | 10 |
| GD (mm) | 8 | 7 | 7 |
| Rolling resistance | 104 | 105 | 106 |
| Dry braking performance | 104 | 104 | 104.5 |

TABLE 2-2

|  | Comparative Example 1 | Comparative Example 2 | Comparative Example 3 |
|---|---|---|---|
| TW (mm) | 160 | 166 | 158 |
| SW (mm) | 206 | 206 | 206 |
| TW/SW | 0.78 | 0.81 | 0.77 |
| CW100 (mm) | 154 | 159 | 153 |
| CW70 (mm) | 150 | 155 | 147 |
| CW100/CW70 | 1.03 | 1.03 | 1.04 |
| SH (mm) | 122 | 122 | 122 |
| SWH (mm) | 59 | 59 | 59 |
| TW × 0.04 − (SWH/SH − 0.5) × 15 | 6.6 | 6.9 | 6.6 |
| TW × 0.07 − (SWH/SH − 0.5) × 15 | 11.4 | 11.9 | 11.3 |
| D (mm) | 6 | 6 | 6 |
| R1 (mm) | 35 | 35 | 35 |
| BW (mm) | 155 | 160 | 155 |
| BW/TW | 0.97 | 0.96 | 0.98 |
| Presence/absence of belt cover | No | No | No |
| TW × ¼ (mm) | 40 | 41.5 | 39.5 |
| GC (mm) | 46 | 46 | 40 |
| L (mm) | 30 | 32 | 30 |
| L/(TW/2) | 0.38 | 0.39 | 0.38 |
| Standard center value of tire outer diameter (mm) | 652 | 652 | 652 |
| Tire outer diameter (mm) | 650 | 650 | 650 |
| Standard center value of total tire width (mm) | 209 | 209 | 209 |
| Total tire width (mm) | 206 | 206 | 206 |
| F1 (mm) | 60 | 60 | 60 |
| F1/SH | 0.49 | 0.49 | 0.49 |
| ES (mm) | 5 | 5 | 5 |
| GD (mm) | 8 | 8 | 8 |
| Rolling resistance | 100 | 95 | 101 |
| Dry braking performance | 100 | 101 | 98 |

According to Table 1, it can be seen that the pneumatic tires of Examples 1 to 9 which belong to the technical scope of the present technology (that is, improvements are added to TW/SW and CW100/CW70) are superior in both rolling resistance and dry braking performance as compared to the pneumatic tires of Comparative Examples 1 to 3, which do not belong to the technical scope of the present technology.

The invention claimed is:

1. A pneumatic tire, comprising:
a pair of left and right bead portions;
sidewall portions connected to an outer side in a radial direction of the bead portions;
a tread portion extending between the sidewall portions;
a carcass including at least one carcass plies extending in a toroidal shape between the pair of left and right bead portions;

a belt including at least one belt layers disposed on an outer side in a tire radial direction of the carcass and including cords; and a tread rubber disposed on an outer side in the tire radial direction of the belt and constituting a portion of the tread portion, in a state in which the pneumatic tire is mounted on a regular rim and inflated to 5% of a specified internal pressure; wherein a tread width is TW, a total tire width is SW in a tire meridian cross-sectional view, and a relationship of $0.80 \leq TW/SW \leq 0.95$ is satisfied, and a ground contact width at a load of 100% of a maximum load capacity is CW100, a ground contact width at a load of 70% of the maximum load capacity is CW70, and a relationship of $1.04 \leq CW100/CW70 \leq 1.15$ is satisfied.

2. The pneumatic tire according to claim 1, wherein a tire radial direction dimension between an outermost point in the tire radial direction of a tire equatorial plane and an end point in the tire width direction of the tread rubber is D, a tire cross-sectional height is SH, a tire radial direction height up to a tire maximum width position is SWH, and a radius of curvature of an arc of the shoulder portion is R1, a relationship of $TW \times 0.04 - (SWH/SH - 0.5) \times 15 \leq D \leq TW \times 0.07 - (SWH/SH - 0.5) \times 15$ and a relationship of $5 \text{ mm} \leq R1 \leq 30 \text{ mm}$ are satisfied, and a ratio BW/TW of a width BW of an effective belt layer and the tread width TW satisfies a relationship of $0.80 \leq BW/TW \leq 0.90$, and a belt cover is formed on an outer side in the tire width direction of a belt layer having a maximum width.

3. The pneumatic tire according to claim 1, wherein the tread portion includes at least two main grooves extending in a tire circumferential direction, and a center position in the tire width direction of the main groove on an outermost side in the tire width direction of the main grooves is present at a position at a distance of ¼ or less of the tread width TW from the tire equatorial plane.

4. The pneumatic tire according to claim 1, wherein an outer contour of the tread portion includes a central portion arc located at a central portion in the tire width direction and a pair of shoulder arcs connected to the outer side in the tire width direction of the central portion arc, a length in the tire width direction of the central portion arc is 2L, and a relationship of $0.40 \leq L/(TW/2) \leq 0.70$ is satisfied.

5. The pneumatic tire according to claim 1, wherein a tire outer diameter is equal to or greater than a standard center value.

6. The pneumatic tire according to claim 1, wherein the total tire width is equal to or greater than a standard center value.

7. The pneumatic tire according to claim 1, wherein the bead portion includes a bead core and a bead filler formed on an outer side in the tire radial direction of the bead core, a tire radial direction dimension from a belt edge to a bead filler top is F1, and a relationship of $0.50 \leq F1/SH \leq 0.80$ is satisfied.

8. The pneumatic tire according to claim 1, wherein the bead portion includes a bead core and a rubber layer formed on an outer side in the tire radial direction of the bead core, a tire radial direction dimension from a belt edge to a bead core is F2, and a relationship of $0.50 \leq F2/SH \leq 0.80$ is satisfied.

9. The pneumatic tire according to claim 1, wherein an inter-belt-edge distance ES between a belt layer with a maximum width and a belt layer with a minimum width satisfies a relationship of $5 \text{ mm} < ES < 15 \text{ mm}$.

10. The pneumatic tire according to claim 1, wherein a depth of at least a main groove including the tire equatorial plane or a main groove closest to the tire equatorial plane among the main grooves is GD, and a relationship of $4.5 \text{ mm} \leq GD \leq 7.5 \text{ mm}$ is satisfied.

11. The pneumatic tire according to claim 2, wherein the tread portion includes at least two main grooves extending in a tire circumferential direction, and a center position in the tire width direction of the main groove on an outermost side in the tire width direction of the main grooves is present at a position at a distance of ¼ or less of the tread width TW from the tire equatorial plane.

12. The pneumatic tire according to claim 11, wherein an outer contour of the tread portion includes a central portion arc located at a central portion in the tire width direction and a pair of shoulder arcs connected to the outer side in the tire width direction of the central portion arc, a length in the tire width direction of the central portion arc is 2L, and a relationship of $0.40 \leq L/(TW/2) \leq 0.70$ is satisfied.

13. The pneumatic tire according to claim 12, wherein a tire outer diameter is equal to or greater than a standard center value.

14. The pneumatic tire according to claim 13, wherein the total tire width is equal to or greater than a standard center value.

15. The pneumatic tire according to claim 14, wherein the bead portion includes a bead core and a bead filler formed on an outer side in the tire radial direction of the bead core, a tire radial direction dimension from a belt edge to a bead filler top is F1, and a relationship of $0.50 \leq F1/SH \leq 0.80$ is satisfied.

16. The pneumatic tire according to claim 14, wherein the bead portion includes a bead core and a rubber layer formed on an outer side in the tire radial direction of the bead core, a tire radial direction dimension from a belt edge to a bead core is F2, and a relationship of $0.50 \leq F2/SH \leq 0.80$ is satisfied.

17. The pneumatic tire according to claim 16, wherein an inter-belt-edge distance ES between a belt layer with a maximum width and a belt layer with a minimum width satisfies a relationship of $5 \text{ mm} < ES < 15 \text{ mm}$.

18. The pneumatic tire according to claim 17, wherein a depth of at least a main groove including the tire equatorial plane or a main groove closest to the tire equatorial plane among the main grooves is GD, and a relationship of $4.5 \text{ mm} \leq GD \leq 7.5 \text{ mm}$ is satisfied.

* * * * *